Oct. 22, 1968   D. R. WATKINS   3,406,501
AUTOMOBILE ENGINE EXHAUST FILTER
Filed July 6, 1967
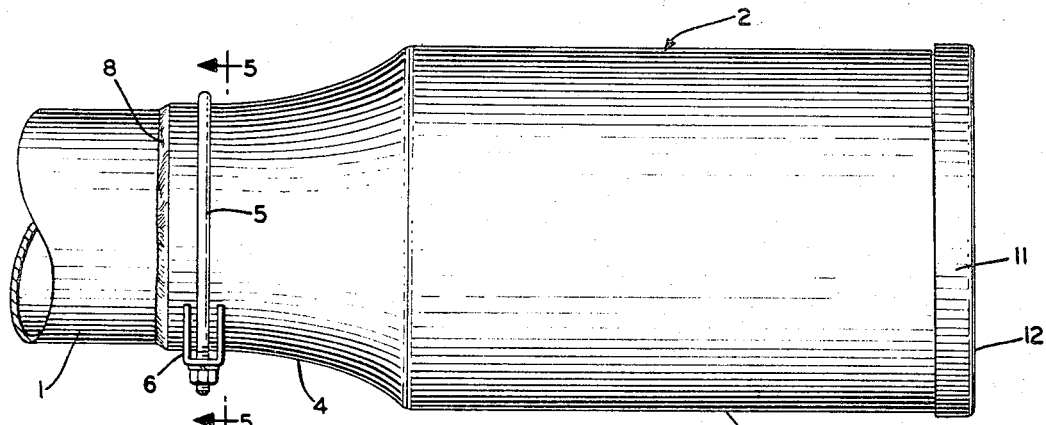
Fig. 1
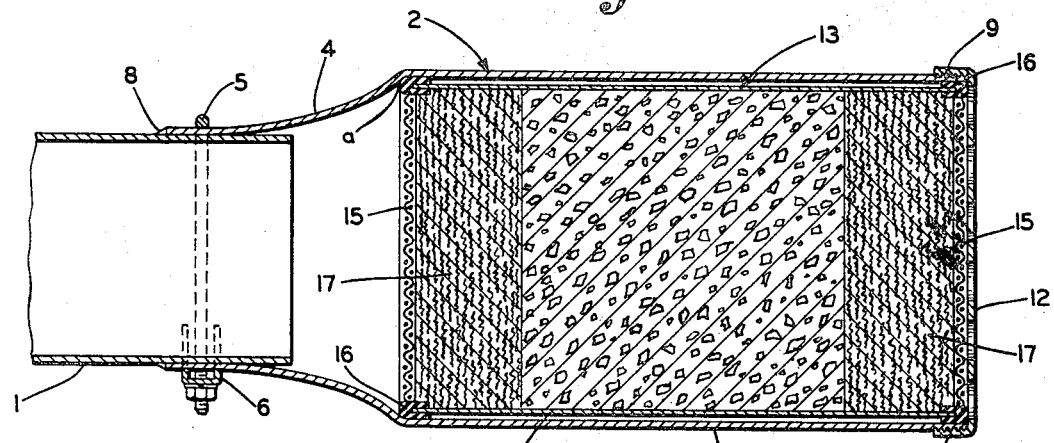
Fig. 2
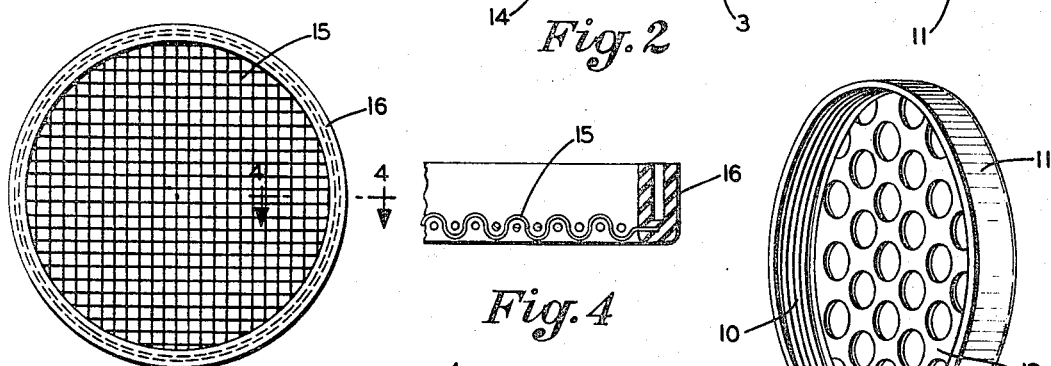
Fig. 3
Fig. 4
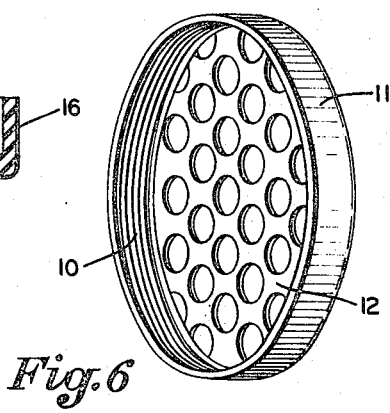
Fig. 6
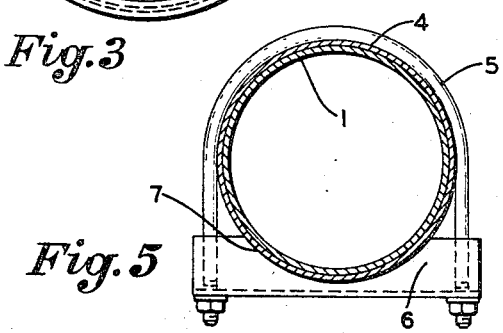
Fig. 5
INVENTOR.
David R. Watkins
BY
Frease & Bishop
ATTORNEYS

United States Patent Office 3,406,501
Patented Oct. 22, 1968

3,406,501
AUTOMOBILE ENGINE EXHAUST FILTER
David R. Watkins, 3210 E. Diamond St.,
Middlebranch, Ohio 44652
Filed July 6, 1967, Ser. No. 651,621
5 Claims. (Cl. 55—316)

ABSTRACT OF THE DISCLOSURE

An automobile engine exhaust filter having a cylindrical shell with means for attaching one end thereof to a tailpipe, and a perforate cap detachably connected to the other end. A replaceable cartridge is located within the shell having foraminous end members at each end and containing alternate layers of fibrous filtering material and a filtering material consisting largely of activated charcoal.

Background of the invention

*Field of the invention.*—The invention relates to a filter and absorber for the products of combustion of internal combustion engines, and more particularly to such a device adapted to be connected to the tailpipe of an automobile engine.

With the large number of automobiles on the streets today, the gases and fumes given off by the exhausts of these automobiles have become a menace to the health of persons breathing the same.

*Description of the prior art.*—Attempts have been made to absorb and filter the exhaust gases from automobiles by various means, but up to the present it is not known that any satisfactory device has been produced for this purpose.

Summary of the invention

The invention may be briefly described in general terms as comprising a hollow cylindrical metal shell, one end of which may be reduced in diameter so as to slidably fit upon a tailpipe with means, such as a U-bolt, for clamping the same upon the tailpipe. The other end of the shell has external screw threads to receive the internally threaded annular flange of a perforate end cap.

A replaceable cartridge is contained within the cylindrical shell and comprises a sheet metal tube having foraminous end members at each end. Each end member may comprise a disc of wire screen having a ring of rubber or the like connected to its periphery, the rubber ring having an annular groove therein adapted to receive the adjacent end of the sheet metal tube.

The cartridge is filled with filtering and absorbent material including a layer of fibrous material at each end, such as "Kordel" fiber produced by Eastman Kodak Company. The space between the layers of this fibrous material is filled with a material consisting mostly of activated charcoal and which is preferably a mixture known as "Hopcolite" comprising activated charcoal with relatively small amounts of soda lime, manganese and oxide of copper.

It is therefore an object of the invention to provide an automobile engine exhaust filter of the character referred to.

Another object of the invention is to provide such a filter which will filter and absorb poisonous gases and fumes given off by the exhaust of an automobile engine.

A further object of the invention is to provide a device of the character referred to which may be easily and readily connected to a tailpipe of an automobile.

It is also an object of the invention to provide a device of this character having quickly and easily replaceable cartridges.

Another object of the invention is to provide such a filter containing fibrous material such as "Kordel" fibers, and activated charcoal mixed with relatively small amounts of soda lime, manganese and oxide of copper.

The above objects together with others which will be apparent from the drawing and following description, or which may be later referred to, may be attained by constructing the improved exhaust filter in the manner hereinafter described in detail and illustrated in the accompanying drawing.

Brief description of the drawing

FIG. 1 is a side elevation of an exhaust filter embodying the invention, showing the same attached to the tailpipe of an automobile;

FIG. 2 is a longitudinal sectional view through the filter shown in FIG. 1;

FIG. 3 is an elevation of one of the end members for the replaceable cartridge;

FIG. 4 is an enlarged fragmentary section taken on the line 4—4, FIG. 3;

FIG. 5 is a transverse section taken on the line 5—5, FIG. 1; and

FIG. 6 is a detached perspective view of the perforate screw cap.

Description of the preferred embodiment

The end of an automobile tailpipe is indicated at 1. The invention comprises a shell adapted to be connected to the end of the tailpipe and containing a replaceable cartridge having filtering and absorbing material therein. The shell is indicated generally at 2 and is formed of sheet metal comprising the cylindrical portion 3 with a reduced portion 4 at one end adapted to slidably fit over the end of the tailpipe.

For the purpose of attaching the shell 2 to the tailpipe, a U-bolt 5 is provided, the cross bar 6 of which has the arcuate recess 7 therein to receive the reduced portion 4 of the shell. As best shown in FIGS. 1 and 2, the cross bar 6 may be of channel cross section.

For the purpose of providing an air-tight seal between the tailpipe 1 and the reduced end portion 4 of the shell 2, any suitable plastic material, capable of withstanding the temperature of the tailpipe, may be placed around the end of the shell, as indicated at 8 in FIGS. 1 and 2.

The outer end of the shell 2 is externally screw threaded, as indicated at 9 in FIG. 2, to receive the internal threads 10 in the annular flange 11 of the perforate end cap 12.

A replaceable filter cartridge, generally indicated at 13, is located within the cylindrical portion 3 of the shell 2. This cartridge comprises the cylindrical tube 14 with foraminous end members at each end.

Each of the end members comprises a wire mesh disc 15, the periphery of which is embedded in a ring 16 of rubber or rubber-like material capable of withstanding the temperature to which a tailpipe is subjected.

The rings 16 are of channel cross section, as best shown in FIG. 4, and are adapted to frictionally engage over the opposite ends of the tube 14, to enclose the filter material therein.

When the filter cartridge is in position in the shell 2, as shown in FIG. 2, it will be seen that the rubber ring 16 at the inner end of the cartridge rests against the shoulder *a* of the shell 2, as shown in FIG. 2, while the rubber ring 16 of the outer end member of the cartridge rests against the perforate end cap 12.

Also, as seen in FIG. 2, both of the rings 16 have a sliding fit within the cylindrical portion 3 of the shell. Thus, the cartridge is held snugly in position and there is no rattle or noise of any kind caused by movement of the cartridge within the shell.

As best shown in FIG. 2, the filter material comprises a layer of fibrous material 17 located within each end of the tube 14, against the adjacent foraminous end member 15. This material is preferably "Kordel" fiber, a closely woven nylon base fiber produced by Eastman Kodak Company.

The cartridge tube is filled, between these layers of "Kordel" fiber, with a filtering material which consists largely of activated charcoal and which is preferably a mixture known as "Hopcolite" comprising activated charcoal with relatively small amounts of soda lime, manganese and oxide of copper.

With this filter attached to the tailpipe of an automobile in the manner disclosed, all of the exhaust gases from the automobile engine must pass through the filtering material where all poisonous gases and fumes are filtered and absorbed by the "Kordel" fiber and "Hopcolite" mixture.

When the filter cartridge becomes loaded it may be quickly and easily replaced by unscrewing the end cap 12 from the shell 2, removing the old cartridge and placing a new one within the shell and replacing the end cap upon the shell.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of a preferred embodiment thereof, and the advantageous new and useful results obtained thereby; the new and useful construction, and reasonable mechanical equivalents thereof obvious to those skilled in the art, are set forth in the appended claims.

I claim:

1. An automobile engine exhaust filter for attachment to an automobile engine tailpipe, said filter comprising a cylindrical sheet metal shell having a reduced end portion for fitting upon a tailpipe, a perforate end cap removably mounted upon the other end of the shell, a replaceable cartridge in the shell, said cartridge comprising a cylindrical tube slidably fitting within the shell, a wire mesh end piece at each end of the tube, a layer of closely woven nylon base fiber in each end of the tube against the adjacent wire mesh end piece, and the remainder of the tube between said layers of fiber being filled with a filtering material consisting mostly of activated charcoal with small amounts of soda lime, manganese and oxide of copper.

2. An automobile engine exhaust filter as defined in claim 1, in which an internal shoulder is formed in the shell at the junction of said reduced end portion, and in which one end of the cartridge contacts said shoulder and the other end of the cartridge contacts said perforate end cap.

3. An automobile engine exhaust filter as defined in claim 2, in which the periphery of each wire mesh end piece is embedded in a rubberlike ring, each of said rings being of channel cross section, and each end of the tube being received in the channel of the adjacent ring.

4. An automobile engine exhaust filter as defined in claim 1, in which a U-bolt clamps the reduced end portion of the shell upon the tailpipe, and in which the joint between the tailpipe and said reduced end portion is sealed with a plastic material that will withstand the temperature to which tailpipes are subjected.

5. An automobile engine exhaust filter as defined in claim 4, in which the perforate end cap is screw threaded upon the shell.

References Cited

UNITED STATES PATENTS

| | | | |
|---|---|---|---|
| 2,077,563 | 4/1937 | Henry | 55 |
| 2,702,089 | 2/1955 | Engelder | 55—388 |
| 2,795,103 | 6/1957 | Jenison | 55—527 |
| 3,196,871 | 7/1965 | Hormats et al. | 55—387 |

REUBEN FRIEDMAN, *Primary Examiner.*

C. N. HART, *Assistant Examiner.*